United States Patent [19]
Terasawa

[11] Patent Number: 4,739,340
[45] Date of Patent: Apr. 19, 1988

[54] INK JET CAPPING-PURGING OPERATIONAL CHECKS METHOD

[75] Inventor: Koji Terasawa, Mitaka, Japan
[73] Assignee: Canon Kabushiki Kaisha, Tokyo, Japan

[21] Appl. No.: 913,577
[22] Filed: Sep. 30, 1986

Related U.S. Application Data

[63] Continuation of Ser. No. 692,617, Jan. 18, 1985, abandoned.

[30] Foreign Application Priority Data

Jan. 31, 1984 [JP] Japan .................................. 59-14403

[51] Int. Cl.[4] ...................... G01D 18/00; G01D 15/18
[52] U.S. Cl. ....................................... 346/1.1; 346/75; 346/140 R
[58] Field of Search ....................... 346/1.1, 75, 140 R

[56] References Cited

U.S. PATENT DOCUMENTS

| | | | |
|---|---|---|---|
| 4,223,322 | 9/1980 | van Raamsdonk | 346/140 |
| 4,306,245 | 12/1981 | Kasugayama et al. | 346/140 R |
| 4,340,897 | 7/1982 | Miller | 346/140 R |
| 4,371,881 | 2/1983 | Bork et al. | 346/140 |
| 4,401,990 | 8/1983 | Aiba et al. | 346/75 |
| 4,403,233 | 9/1983 | Terasawa et al. | 346/140 R |
| 4,410,900 | 10/1983 | Terasawa | 346/140 R |
| 4,432,004 | 2/1984 | Glattli | 346/140 |
| 4,437,105 | 3/1984 | Mrazek et al. | 346/140 R |
| 4,543,589 | 9/1985 | Terasawa | 346/140 R |
| 4,577,203 | 3/1986 | Kawamura | 346/140 R |

*Primary Examiner*—E. A. Goldberg
*Assistant Examiner*—Gerald E. Preston
*Attorney, Agent, or Firm*—Fitzpatrick, Cella, Harper & Scinto

[57] ABSTRACT

In a capping mechanism wherein the surroundings of orifices provided to discharge liquid are sealed and suction of the liquid is effected by a negative pressure, a liquid absorbing member is provided on a cap side below the orifices so as to be brought into contact with and compressed by a surface in which the orifices are provided.

4 Claims, 3 Drawing Sheets

INK JET CAPPING-PURGING OPERATIONAL CHECKS METHOD

This application is a continuation of application Ser. No. 692,617 filed Jan. 18, 1985, now abandoned.

BACKGROUND OF THE INVENTION

1. Field of the Invention

This invention relates to a capping mechanism, and more particularly to a capping mechanism adapted to effect the operation for recovering discharge function by causing negative pressure suction relative to the orifice portion of a liquid injection recording apparatus for discharging liquid as flying droplets.

2. Description of the Prior Art

The liquid injection recording apparatus is a recording apparatus in which a pressure corresponding to a recording signal is applied to liquid such as ink filling a liquid flow path and the liquid is discharged as liquid droplets from orifices formed at the fore end of the liquid flow path, thereby effecting dot recording on a recording medium, and is also called an ink jet printer.

In the liquid injection recording apparatus of this type, when a mechanical shock or a sudden temperature change is imparted to a recording head formed with one or more orifices, air enters the flow path or solvent gases are produced in the liquid to destroy normal meniscus, whereby discharge of liquid droplets ar not effected in conformity with the recording signal or, if discharged, the liquid droplets are further dispersed as splash or satellite, thereby causing unsatisfactory printing.

To recover the apparatus from such unsatisfactory discharge or unsatisfactory printing, there is provided a discharge recovering mechanism for sucking ink from the orifice side by a negative pressure and recovering normal meniscus.

This discharge recovering mechanism is called a capping device and is provided, for example, at the home position of the recording head. The discharge recovering mechanism is provided with an elastic cap adapted to be brought into intimate contact with an orifice surface when the recording head has returned to its home position, and this cap is urged against the orifice surface to effect moderate negative pressure suction and suck liquid from the orifice portion, thereby forming meniscus at a normal position.

An example of the construction of the discharge recovering mechanism of this type according to the prior art is schematically shown in FIGS. 1 to 3 of the accompanying drawings.

In these Figures, reference numeral 1 designates a recording head unit having at the rear thereof a sub-tank provided on a carriage, not shown. A plurality of orifices 2 are formed in the fore end portion of the recording head unit 1. The orifices 2 provided in the fore end portion need not always be plural, but a single such orifice may be provided there.

Liquid such as ink is always supplied from a main tank, not shown, into the sub-tank of the recording head unit 1 so that the liquid can always be supplied into a liquid flow path provided between the orifices 2 and the sub-tank.

On the other hand, a capping device is provided on the fixed portion side of the apparatus. This capping device has a cap 3 in which an elastic member 4 is contained. A recess 7 is formed in the fore end portion of the elastic member 4 and is connected to a negative pressure suction pump 6 through a tube 5.

To effect the operation for recovering the discharge function under the above-described construction, the cap 3 is advanced with the orifices 2 being opposed to the cap 3, the elastic member 4 is urged so as to surround all the orifices 2, and the negative pressure suction pump 6 is operated to render the interior of the recess 7 into a negative pressure state through the tube 5 and effect the suction of the liquid from the orifices 2.

By such operation, the meniscus too much retracted recovers its normal position as previously described, whereby normal recording can be accomplished.

However, the adoption of the capping device which is the discharge recovering mechanism of the above-described structure using a negative pressure leads to the following disadvantages.

The cap 3 is brought into intimate contact with the orifice surface so as to surround the orifices 2 to thereby effect capping and negative pressure suction, whereafter when the cap is open, the sucked ink 8 is in the recess 7 as shown in FIG. 2 and therefore is pulled toward the orifices 2 and toward the elastic member 4 by surface tension. As a result, an ink pool 9*a* is created on the orifice side and an ink pool 9*b* swelling out from the elastic member 4 is created on the cap side.

As a result, the ink pool 9*a* on the orifice side covers the orifices 2 as shown in FIG. 3 and thus causes unsatisfactory discharge, and the ink pool 9*b* on the cap side swelling out from the elastic member 4 contaminates the surroundings of the cap and by a number of recovering operations, the contamination spreads toward the carriage for sliding the sub-tank.

Such a phenomenon makes it difficult to retain the liquid because the area of the opening of the recess 7 of the elastic member 4 is very great in a recording head of the multi-orifice type, and thus the inconvenience resulting from the liquid pools occurs more often.

SUMMARY OF THE INVENTION

The present invention has been made to eliminate the above-noted disadvantages peculiar to the prior art and an object thereof is to provide a capping mechanism designed such that when the cap is open, no liquid pool is created on the orifice side and on the cap side.

Another object of the present invention is to provide a capping mechanism having a construction in which a liquid absorbing member is provided in proximity to orifices and adapted to be urged against the orifice surface below the orifices and when the cap is open, the liquid absorbing member effects idle suction.

Still another object of the present invention is to provide a capping mechanism in which the surroundings of orifices provided to discharge liquid are sealed and ink suction recovery is effected by a negative pressure, characterized in that a liquid absorbing member is provided on the cap side and is adapted to be brought into contact with and compressed by the orifice surface below the orifices.

DESCRIPTION OF THE PREFERRED EMBODIMENTS

Figure 1:
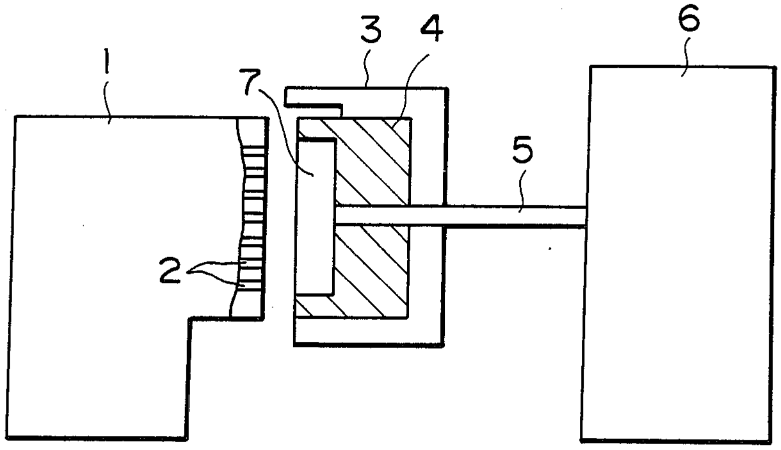
FIG. 1 PRIOR ART
FIGS. 1 to 3 show an example of the capping mechanism according to the prior art, FIG. 1 illustrating the state before the capping, FIG. 2 illustrating the moment when the cap is about to separate after the capping, and FIG. 3 illustrating the state in which liquid pools are created.

The present invention will hereinafter be described in detail with respect to some embodiments thereof shown in the drawings.

Figure 2:
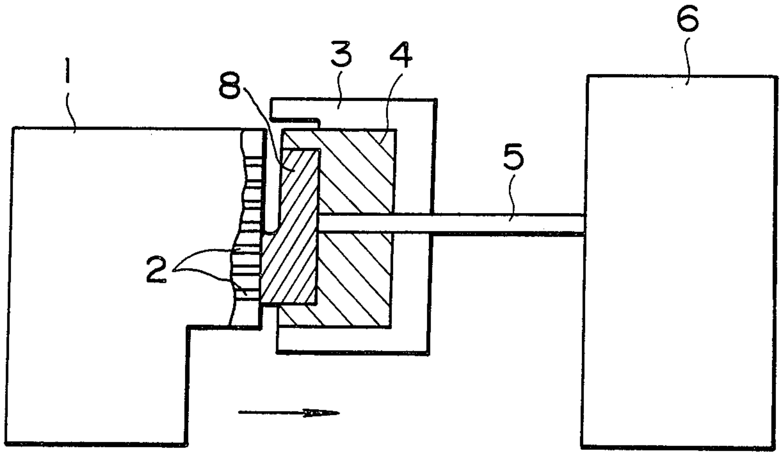
FIG. 2 PRIOR ART
Figure 3:
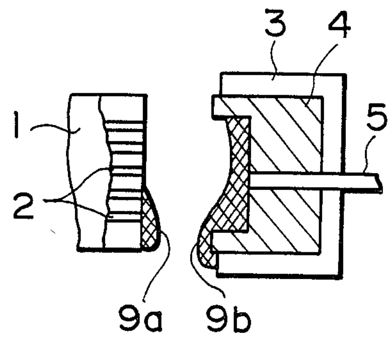
FIG. 3 PRIOR ART
Figure 4:
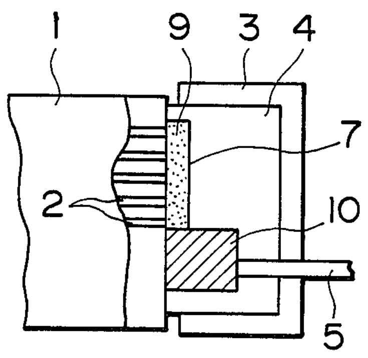
FIGS. 4 and 5 show a first embodiment of the present invention, FIG. 4 illustrating the state of capping, and FIG. 5 illustrating the state in which the capping has been terminated.
Figure 5:
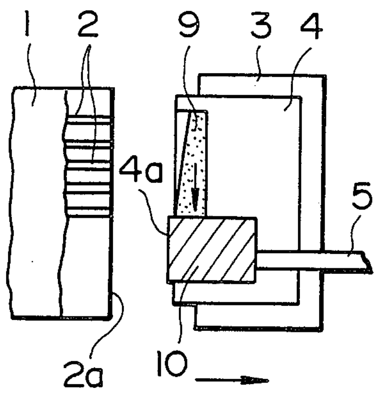

FIGS. 4 and 5 illustrate a first embodiment of the present invention. In FIGS. 4 and 5, portions similar to those shown in FIGS. 1–3 are given similar reference characters and need not be described. In the present embodiment, an ink absorbing member 10 is provided below the recess 7 of an elastic member 4 which corresponds to orifices 2, and this ink absorbing member 10 is connected to a tube 5.

This ink absorbing member 10 is provided so as to project forwardly from the elastic member 4 as shown in FIG. 5 when the capping is not effected.

Since the present embodiment is constructed as described above, the ink absorbing member 10 is in its compressed state when a cap 3 is advanced as shown in FIG. 4 so that the orifice surface (the flat surface in which the orifices 2 are provided) is in contact with the elastic member 4 and the orifices 2 become opposed to the recess 7.

When, in this state, ink is sucked from the orifices 2 through the tube 5 communicating with a negative pressure source and subsequently the atmospheric state is restored, the sucked ink collects in the recess 7 of the elastic member 4 and becomes balanced with the ink being retained by the ink absorbing member 10.

When the cap is then retracted, the compressed ink absorbing member 10 expands and the pressure contact surface 4*a* of the ink absorbing member 10 restores its original projected state. At that time, the ink 9 is drawn into the ink absorbing member 10 because the ink absorbing member 10 which is of a porous structure has a great liquid-retaining power.

The ink absorbing member 10 is designed to contact the front surface 2*a* of the orifice surface below the orifices 2 and therefore, even when the cap 3 has been retracted, the ink which tends to form a liquid pool below the orifices 2 is sucked into the ink absorbing member 10 and thus, there is never created the liquid pool which has heretofore been experienced.

The volume of the ink absorbing member 10 may be determined by the amount of sucked ink during each operation for recovering the discharge function and the liquid-retaining ability during the opening of the cap becuase the amount of retained ink depends on the volume or the material.

Figure 6:
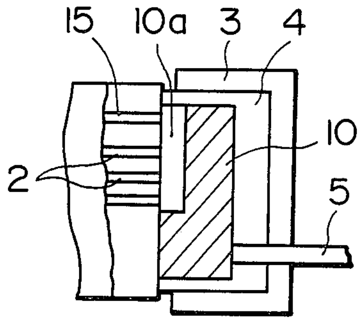
FIG. 6 illustrates a second embodiment of the present invention and the state of capping thereof.

FIG. 6 illustrates a second embodiment of the present invention. In the present embodiment, an ink absorbing member 10 having a considerable volume is disposed in the elastic member 4. A recess 10*a* is formed in that portion of the ink absorbing member 10 which corresponds to the orifices 2 and an air vent hole 15. If the volume of the ink absorbing member 10 is so increased, no liquid leakage will occur becuase it has a sufficient liquid-retaining power even when a great deal of ink has been sucked into the ink absorbing member.

Figure 7:
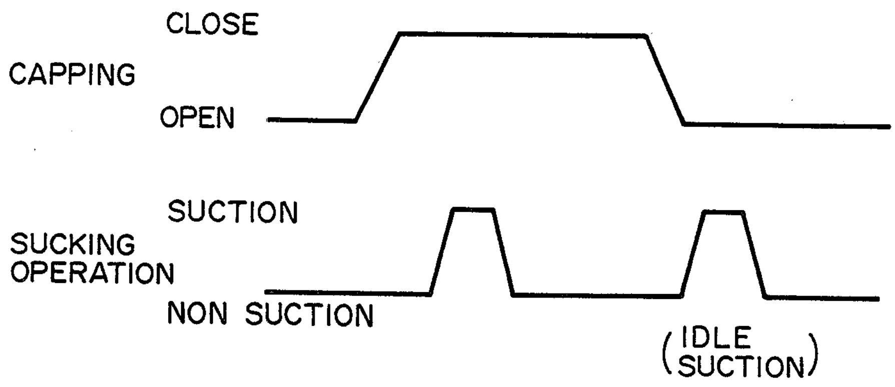
FIG. 7 is a timing chart of the capping operation and the sucking operation.

Now, FIG. 7 shows the timing of the capping operation and of the sucking operation, and also shows a state in which idle suction has been effected with the cap being open to secure the liquid-retaining ability of the ink absorbing member during each recovering operation.

If idle suction is so effected, the ink absorbing member 10 can always have a reliable liquid-retaining ability and can reliably effect the absorption of ink.

Figure 8:
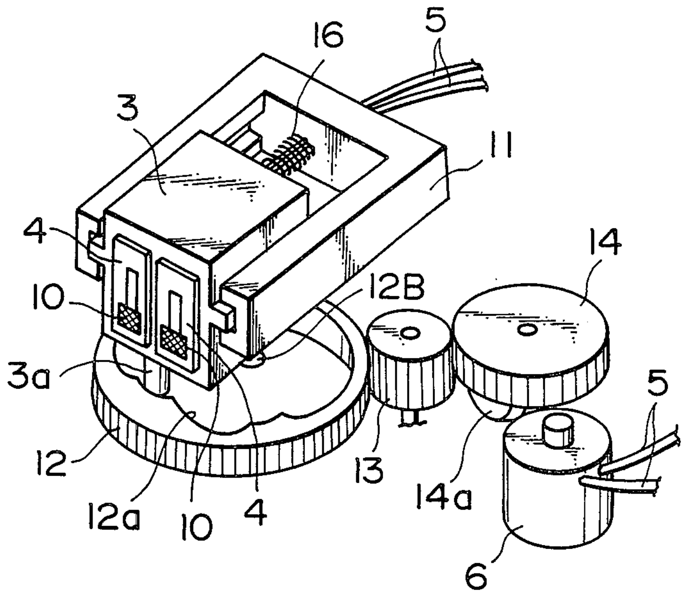
FIG. 8 is a perspective view of a driving mechanism for effecting the capping operation.

FIG. 8 illustrates a mechanism for effecting such a capping operation. In FIG. 8, reference numeral 11 designates a guide generally formed into a U-shape. The cap 3 is slidably fitted in this guide 11.

The cap 3 is always given a force in a direction to advance by a spring 16.

Also, in the present embodiment, the cap 3 is designed to be able to correspond to two types of heads, but of course, it is easy to make the cap into a multitype capable of corresponding to more than two types.

Designated by 12 is a cam disc. A cam 12*a* of a predetermined shape is formed on the inside of the cam disc 12. A shaft 3*a* extending from the lower end of the cap 3 is in contact with the cam 12*a*, and the capping operation is effected with rotation of the cam disc 12.

Designated by 13 is a drive gear which is rotated by a motor, not shown, and is in mesh engagement with a gear formed on the outer peripheral surface of the cam disc 12. The drive gear 13 is also in mesh engagement with another gear 14, and a cam 14*a* is projectedly provided on the underside of this gear 14, and a suction pump 6 can be operated by this cam 14*a*.

If such a structure is adopted, the capping device can be constructed very simply.

Now, as is apparent from FIGS. 4 to 6, the reason why the ink absorbing member 10 is not in direct contact with the orifices 2 is that if the ink absorbing member contacts the orifices 2 when foreign materials having a diameter substantially equal to the diameter of the orifices 2 are present on the ink absorbing member 10 side, these foreign materials may be forced into the orifices.

As is apparent from the foregoing description, according to the present invention, a structure is adopted in which the ink absorbing member adapted to be compressed during the capping is provided on the cap side and is connected to a negative pressure source and therefore, the ink in the cap sucked during the recovering operation can be reliably retained and any ink pool which tends to be created on the orifice side can be reliably sucked, and the contamination of the device by the liquid pool as has heretofore been experienced can be completely prevented.

Also, the fact that the ink absorbing member is not in direct contact with the orifices can prevent any foreign material from being forced into the orifices.

I claim:

1. A method of operating an ink liquid suction device for an ink jet printer including an orifice surface surrounding at least one orifice provided to discharge ink and capping means having an absorbing member in a space therein, comprising the steps of:

bringing the capping means into contact with the orifice surface such that no orifice is contacted by the capping means and the absorbing member is brought into contact with and compressed by a portion of the orifice surface located below all of the orifices;

sucking ink from the orifice through the absorbing member when the capping means is in contact with the orifice member when the capping means is in contact with the orifice surface; and separating the capping means from the orifice surface and sucking ink from the absorbing member after the capping means has been separated from the orifice surface to remove from the capping means ink remaining in the absorbing member.

2. A method according to claim 1, wherein said sucking steps are executed by a pump which generates negative pressure.

3. A method according to claim 1, wherein said steps are performed in sequence by a cam mechanism.

4. A method according to claim 1, wherein the capping means includes an elastic member for contacting the orifice surface to provide a seal around the orifices.

* * * * *